…

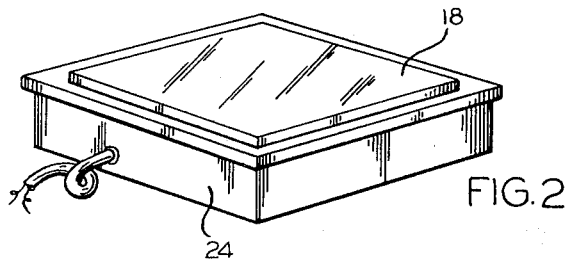
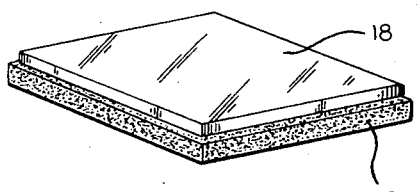
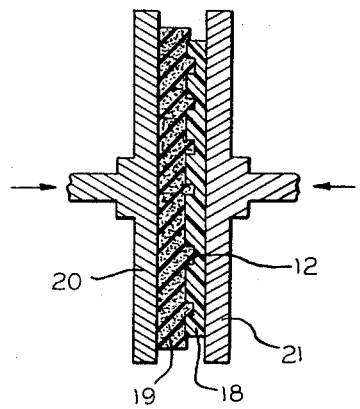
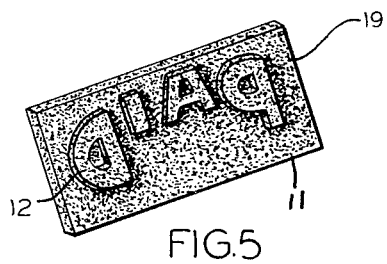
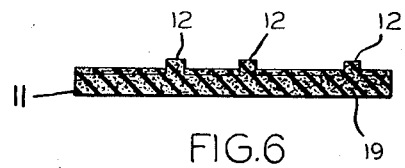
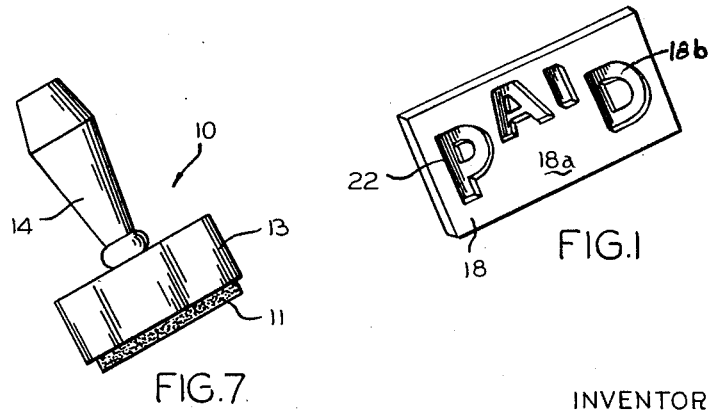
INVENTOR
SAMUEL M. WEISSMAN
BY Alter and Weiss
ATTORNEYS

United States Patent Office 3,506,749
Patented Apr. 14, 1970

3,506,749
EMBOSSING POROUS STAMP MATERIAL
Samuel M. Weissman, c/o Bankers & Merchants, Div. of Consolidated Foods Corp., 4410 N. Ravenswood, Chicago, Ill. 60640
Continuation-in-part of application Ser. No. 405,228, Oct. 20, 1964. This application Nov. 21, 1968, Ser. No. 777,855
Int. Cl. B29d 27/00; B29h 7/20
U.S. Cl. 264—102                                          11 Claims

ABSTRACT OF THE DISCLOSURE

A porous ink stamp having indicia embossed upon a flexible foam member and a method for producing same whereby porous indicia and a fused background are formed on the member by the preselected coaction of heat and pressure whereupon ink contained in the member is able to flow through the indicia while the background is impervious to the ink.

---

This invention relates to a process for producing a stamp having porous embossed characters thereon. More particularly, this invention relates to an embossed stamp formed of substantially uniformly porous polyvinyl chloride flexible foam and a process for embossing characters on a porous polyvinyl chloride flexible foam in order to produce an ink stamp which can retain and store ink therein even after it has been used a number of times. This is a continuation in part from U.S. patent application, Ser. No. 405,228, filed Oct. 20, 1964, and now abandoned.

Heretofore, the production of porous rubber-like articles for manufacturing ink-retaining stamps involved the dispersal of filler into a solid molding material. Wilson's "Process for Preparing Material Used for Molding Microporous Objects" in Patent No. 2,554,485 discloses a process which involves the mixing of a molding material with a filler in a milling operation. A volatile solvent inert to the filler but affecting the molding material assists in dispersing the particles in an even distribution throughout the molding material. The particles are subsequently removed or leached out to produce an end material having uniform porosity. Then ink is injected into the end mateiral, and is stored therein until it is released by use.

The objection to the Wilson process is the prolonged length of time it takes to carry out the involved techniques for producing the porous product of the process.

The cost due to the time involved in the process is reflected in the price of the finished product to the extent that it is twice that of the conventional rubber stamp. In addition, the Wilson product has a disadvantage in that it needs to be in a molten state in order to be able to mold characters from a master mold to the body of a rubber-type stamp.

Previous to the invention herein, material enabling the ink stamp to give repeated ink impressions without re-inking could be produced without using granular filler particles to achieve porosity. In the process for manufacturing these types of ink stamps, releasable material, ink and a gelatin-type substance were mixed together and heated. However, the drawback in the use of this material for ink dispersed throughout the material. The effect was that a rubber stamp made with this process either gave impressions which were too wet or too dry. Furthermore, an additional undesirable feature was that these ink stamps could not be re-inked, so that after a number of impressions, the ink stamp could no longer be utilized.

Therefore, it is an object of the invention to provide a process for producing an embossed porous stamp formed of a flexible foam rubber-type material having pores substantially uniformly sized and spaced.

It is another object of this invention to provide a simple and efficient method for producing an embossed reproduction of porous characters from a master plate.

It is still another object of this invention to provide a microporous product with the pores therein substantially uniformly sized and spaced, said product being adaptable for permanently forming characters thereupon without first subjecting the material to a molten state.

It is yet another object of this invention to provide a process for preparing an ink-retaining embossed stamp from a microporous product used for molding objects, without the use of leachable microfying granular material.

It is yet another object of this invention to produce an embossed stamp from a microporous polyvinyl chloride type of material which stamp is capable of providing a plurality of ink impressions without re-inking.

It is yet another object of this invention to provide an embossed stamp from a microporous material capable of retaining ink and being able to be refilled after the ink has been dissipated therefrom.

One advantage of this invention is that a uniformly sized and evenly distributed porous polyvinyl chloride flexible foam is used and the involved techniques necessary to distribute leachable granules throughout the rubbery material and subsequently removing them therefrom are no longer necessary.

An additional advantage of the present invention is that the time previously required to produce pores in a rubber-type material has been substantially decreased by the utilization of a microporous polyvinyl chloride foam.

Still even a further advantage is that not only is an improved ink stamp produced, but also the savings in time and cost renders the new process and product economically competitive with the conventional ink stamp.

Further objects and advantages of the invention will be apparent from the following description wherein preferred embodiments of the invention are described, especially when read in conjunction with the accompanying drawing in which:

FIG. 1 is an isometric showing of a mold as employed in the practice of this invention;

FIG. 2 is an isometric showing of the mold of FIG. 1 being surface heated prior to application to a piece of foam material in accordance with this invention;

FIG. 3 is an isometric showing of a sheet of foam material placed in contact with the preheated mold of FIG. 2;

FIG. 4 is a sectional view of a mold and sheet of porous material engaged by pressure in accordance with this invention;

FIG. 5 is a single stamp cut from the sheet of FIG. 3;

FIG. 6 is an enlarged sectional fragmentary view of FIG. 5 illustrating the embossed porous indicia with a fused background;

FIG. 7 is a commercial stamp formed by mounting the stamp of FIGS. 4 and 5 in a holder.

Referring now to the drawings, in which like parts bear like numerals throughout the several views, an embossed stamp embodying the present invention is shown in FIG. 7 and accorded general reference 10. Stamp 10 comprises a piece of treated foam material 11 having desired indicia 12 embossed thereupon. The foam 11 is mounted on and carried by a body member 13 to which is secured a handle member 14.

The process of preparing my stamp as is hereinafter described in detail, involves a conventional master plate (not shown) from which I form a mold 18 (see FIG. 1). From mold 18, I form my stamp pad 19 which may include a plurality of individual stamps, or a single stamp cut therefrom, as shown in FIGS. 5 and 6.

In FIG. 4, I illustrate the surface-to-surface engagement of mold 18 with foam pad 19 between vice-like force means 20, 21.

The foam pad 19 is made from a polyvinyl chloride flexible foam which can be permanently compressed or distorted without being placed in a molten condition. The foam is a flexible interconnected cellular material which is not as elastic as rubber and the physical structure thereof includes small substantially uniformly sized pores that are substantially uniformly distributed throughout. Such material can be obtained from R. T. Vanderbilt Company, Inc., East Norwalk, Conn. under the trademark of "Vanyl." While the techniques of making such polyvinyl foam is well known, reference is here made to the article entitled "New Method of Producing Poly (Vinyl Chloride) Foam" by K. M. Deal, D. C. Morris and R. R. Waterman (I and ED Product Research and Development, vol. 3, No. 3, pp. 290 et seq.) for showing the technique used to make the particular foam under the trademark "Vanyl." This foam has been found to be especially adaptable for embossing characters thereon from a master mold to produce porous stamps. For further information see Waterman et al., U.S. Patent Nos. 3,288,729 and 3,301,798.

The mold 18 may be made out of a material which is deformable and thereafter rigid under operating temperatures. Examples of material in this category range all the way from phenolic formaldehyde resins, such as Bakelite, to metals such as brass or magnesium. In a preferred use of the polyvinyl chloride foam 11 for embossing characters thereupon, an ordinary phenolic formaldehyde resinous mold and a magnesium mold were made through the conventional technique; that is, by engagement with a master plate formed by etching or engraving or chemical milling, as may be desired. Character indentations 18b in the mold were formed at a depth of approximately .0625 inch. The character indentations 18b can be numbers or letters. These indentations communicate with the face 18a of the mold.

In my process the face 18a of the mold 18 is heated by a flat surface such as a hot plate 24 having a temperature of 275° F. for thirty seconds, and the mold is placed into contact with a polyvinyl chloride flexible foam 19 as illustrated in FIG. 3 and immediately after contacting the foam 19 a force is applied by a force means 20, 21 to urge the foam 19 and the mold 18 into contact with each other. The force is applied in an environment of room temperature with no additional external heat being applied. A force which produces a pressure of approximately one hundred p.s.i. for a period of one and one-half to two minutes produces the desired result of fusing and permanently compressing that portion of foam that is forced in contact with the face 18a of the mold while raised character references 12 which are not fused and compressed are formed. This is due to the fact that the temperature and force applied to the mold 18 causes the foam to fuse when the heated mold face 18a contacts it while that portion of the foam which does not contact the heated mold face enters the character indentations and remains unfused. The temperature of the structure defining the character indentations 22 has little or no fusing affect upon the foam and thus the embossed characters 12 which are a reproduction of the character indentations 22 are porous and unfused. Due to the fact that the vice-like force means 20, 21 is applied without external heat both the mold and the embossed foam return to room temperature during the period that the pressure or force is applied. However, if after force is applied to the mold, the molded material or foam 19 does not return to room temperature during the period of time that both are in contact, the molded material should then be cooled to room temperature.

The embossed polyvinyl chloride foam so produced, has porous embossed characters 12 since substantially little, if any, fusing occurred in the foam material forming the characters. This was due to the fact that there was no actual contact of the characters with the heated face 18a of the mold, and also there was no appreciable amount of heat transmitted by conduction. In addition, as above stated, the heat applied to the face of the mold was of such temperature and duration that it would not cause the structure of the mold defining the character indentations to fuse the embossed characters 12.

On the other hand, the base or background 11 of the stamp, where the embossed characters extend from includes sealed pores. This is due to the fact that the force applied to the heated mold causes successive layers of the outer surface pores of the foam to become permanently fused or compressed together. The effect is that when ink stored in the stamp is released, it passes primarily through the pores of the characters.

Since the pores are substantially equally sized and substantially equally distributed, the ink will be released from the characters at an equal rate provided that the pressure is equally applied through the stamp.

For storing ink in the embossed foam, the following method could be used. The embossed polyvinyl foam is placed into a chamber wherein the air is evacuated. Ink is dripped through a stop cock into the foam. The ink stamp is heated to a temperature of 140° F. Air pressure is then allowed to come into the chamber when the temperature is 140° F. to return the chamber to normal pressure. The temperature is then allowed to return to room temperature. The inking could be done with a conventional special type rubber stamp ink. The inked foam is good for about twenty thousand impressions without re-inking. At the exhaustion of inking, it is then possible to re-ink by simply spreading the printing surface of the rubber ink with the aforementioned stamp ink.

To further explain the present invention, and not by way of limitation, the following examples illustrate mixtures of ingredients which provide polyvinyl chloride foam having substantially similar physical properties with regard to the uniformly sized and evenly distributed pores. Also, the polyvinyl chloride foam of the below examples distort upon the application of a fusing temperature to soften the material and a pressure to form the desired distortion:

EXAMPLE 1

| | Parts (substantially) |
|---|---|
| Plastisol resin | 100 |
| Dipropylene glycol dibenzoate | 45 |
| Dicapryl phthalate | 35 |
| Low temperature epoxy plasticizer | 5 |
| Frothing aid and stabilizer | 15 |
| Nytal 200–L | 15 |

EXAMPLE 2

| | Parts (substantially) |
|---|---|
| Plastisol resin | 100 |
| Butyl benzyl phthalate | 45 |
| Dioctyl phthalate | 35 |
| Dyphos | 5 |
| Frothing aid and stabilizer | 15 |

EXAMPLE 3

| | Parts (substantially) |
|---|---|
| Plastisol resin | 100 |
| Butyl benzyl phthalate | 35 |
| Dicapryl phthalate | 30 |
| Low temperature epoxy plasticizer | 5 |
| Frothing aid and stabilizer | 12½ |

EXAMPLE 4

| | Parts (substantially) |
|---|---|
| Plastisol resin | 100 |
| Dipropylene glycol dibenzoate | 45 |
| Dioctyl phthalate | 15 |
| Low temperature epoxy plasticizer | 5 |
| Cresyl diphenyl phosphate | 20 |
| Frothing aid and stabilizer | 15 |

EXAMPLE 5

| | Parts (substantially) |
|---|---|
| Plastisol resin | 85 |
| Copolymer dispersion resin | 15 |
| Dipropylene glycol dibenzoate | 45 |
| Dioctyl phthalate | 35 |
| Low temperature epoxy plasticizer | 5 |
| Frothing aid and stabilizer | 15 |

EXAMPLE 6

| | Parts (substantially) |
|---|---|
| Plastisol resin | 60 |
| Copolymer dispersion resin | 40 |
| Low temperature epoxy plasticizer | 5 |
| Frothing aid and stabilizer | 15 |

For the plastisol resin, Exon 654, made by the Firestone Tire and Rubber Company, Opalon 410, made by the Monsanto Chemical Company, or Geon 121, made by B. F. Goodrich Chemical Company are typical compounds which could be used. The plastisol provides the dry resin base of polyvinyl chloride.

Typical epoxy type plasticizers include Monoplex S-73 (Rohm & Haas); and butadiene-acrylonitrile copolymers such as Hycar 1312 (B. F. Goodrich Chemical Company).

The dipropylene glycol and dicapryl phthalate are also plasticizers.

For the frothing aid and stabilizer the product "Fomade," made by R. T. Vanderbilt Company, Inc., East Norwalk, Conn., can be used with optimum result. This is a mixture of amine soap and alkali metal soap in a liquid which is blended with the plastisol in order to incorporate air therein to form a cellular or foam product. The "Fomade" enables the fused mixture to have the physical structure of small pores of substantially uniform size and substantially even distribution throughout the foam without collapse of the foam. The alkali metal soap is an alkali metal salt of a saturated or unsaturated fatty acid including hydroxy fatty acids or mixtures thereof having from 8 to 24 carbon atoms, and preferably having 18 carbon atoms. Typical examples thereof include the potassium and sodium salts of caprylic, capric, lauric, myristic, palmitic, stearic, oleic, linoleic, linolenic and ricinoleic acids. The amine soap is an amine salt of a saturated or unsaturated fatty acid, including hydroxy fatty acids or mixtures thereof having from 8 to 24 carbon atoms. Typical examples thereof include the ammonium, dimethlyamine, triethanolamine and morpholine salts of caprylic, capric, lauric, myristic, palmitic, stearic, oleic, linoleic, linolenic and ricinoleic acids. Morpholine oleate is preferred. For additional information see Waterman et al., U.S. Patent Nos. 3,288,729 and 3,301,798.

The Nytal is a magnesium silicate. Nytal aids in providing a more perfect blending of the ingredients and a more uniformly produced product. The Nytal is produced by the R. T. Vanderbilt Company, Inc., 230 Park Ave., New York, N.Y. 10017. All grades of Nytal have the same average chemical composition as follows:

| | Percent |
|---|---|
| $MgO$ | 29 |
| $SiO_2$ | 57 |
| $CaO$ | 8 |
| $Al_2O_3, Fe_2O_3$ | 2 |
| Ignition loss | 4 |
| | 100 |
| $CO_2$ | .7 |

In particular Nytal 200-L was found to be most desirable. It is a "low consistency" form of Nytal.

Dyphos used above in Example 2 is a stabilizer of vinyls and particularly of the polyvinyl chloride resins. Dyphos is the dibasic lead salt of phosphorous acid. Its composition is a dibasic lead phosphite. Its formula is $2PbO \cdot PbHPO_3 \cdot \frac{1}{2}H_2O$. Dyphos is made by the National Lead Company having its general offices at 111 Broadway, New York 6, N.Y.

After the ingredients are mixed and foamed by mechanical heating they are formed into slabs and placed on release paper and thereafter heated at a temperature and for a period of time to produce an end product having a physical structure containing micropores throughout which are substantially uniform in size and substantially equally distributed throughout.

It has been found that a fused mixture having the aforementioned pores throughout is produced by heating the above-listed mixed ingredients for approximately 15 minutes at a temperature of 335° F. The mixture fuses from 300° F. to 335° F. and is in a gelatin state from 120° F. to 190° F. The fused mixture is cooled preferably to room temperature.

The foam from any of the above mixture is a flexible interconnected cellular foam rubber-type material, which is not as elastic as rubber. The physical structure includes small substantially uniformly sized pores substantially equally distributed throughout. In this preferred mixture, the density of the polyvinyl chloride foam is approximately 23 pounds per cubic foot.

From the preceding description, it becomes apparent that a new and useful ink stamp and a process for producing the same have been herein described, which fulfill all of the foregoing objectives in a remarkably unexpected manner. It is, of course, understood that the description is by way of illustration rather than limitation and that the material used for embossing characters thereon need not be polyvinyl chloride foam as above described, provided that the material used includes the physical properties of having ink-retaining pores disbursed throughout and being fused or permanently compressible when my process for embossing is utilized. Basically, the new and improved ink storing properties are produced by a surface heated mold member being compressed with a foam of the character described, whereby a fused and compressed background is formed, and raised character references which are not fused and compressed in the background is formed. Thus, any combinations of temperatures and pressures and materials that produce the ink stamp with the process described herein are within the purview of this invention. It is still further understood that changes, modifications, and varied applications of this invention may be made without departng from the spirit of this invention, especially as it is defined by the scope of the claims appended hereto.

What is claimed and desired to be secured by Letters Patent of the United States is:

1. The process for embossing porous characters from a material having a low rate of heat conduction,
   a physical structure containing micropores throughout which are substantially uniform in size and substantially equally distributed throughout,
   said material when in a solid state being permanently compressible upon the application of a fusing temperature and a force, said process including:
   heating the face of a master mold, said mold having character indentations therein, the temperature at said face being sufficient to fuse the material at substantially the outer surface of said material when in contact therewith, the temperature of the walls of said indentations having substantially no fusing effect upon said material;
   contacting said face of said master mold with said material to soften the contacting material for molding, the material opposite said indentations having no contact with said face of the mold;
   immediately applying a force to said mold to compress and fuse the background of said contacting foam while forming an unfused embossed reproduction of said character indentations on said foam;
   cooling said embossed material and said mold; and
   removing said embossed material from said mold.

2. The process for embossing porous characters in a flexible substantially uniformly porous polyvinyl chloride foam, said foam when cool and in a solid state being permanently compressible upon the application of a fusing temperature and a force, said process comprising:
   heating the face of a master mold having character indentations leading inwardly from said face, the temperature at said face being sufficient to fuse substantially the outer surface of said polyvinyl foam in contact therewith, the temperature of the walls defining said indentations having substantially no fusing effect upon said polyvinyl foam;
   contacting said face of said master mold with said polyvinyl foam to soften the contacting material for molding, the material opposite said indentations having no contact with the face of the mold;
   immediately applying a force to said mold to compress the background of said contacting foam while forming an embossed reproduction of said character indentations on said foam;
   cooling said mold and said foam; and
   removing said embossed material from said mold.

3. A process for embossing porous characters, as defined in claim 2, wherein said master mold is made out of a material selected from the group consisting of phenolic formaldehyde resins, brass and magnesium and said character indentations formed therein have a depth of .0625 inch.

4. A process for embossing porous characters, as defined in claim 2, wherein said force applied to said contacting foam exerts substantially 100 pounds per square inch pressure for a period of one and a half to two minutes.

5. The process for providing embossed porous ink stamps made from a flexible substantially uniformly porous polyvinyl chloride foam, said foam when cool and in a solid state being permanently compressible upon the application of a fusing temperature and force, said process comprising:
   heating the face of a master mold, said mold having character indentations leading inwardly from said face, the temperature at said face being sufficient to fuse the material at substantially the outer surface of said polyvinyl chloride foam when in contact therewith, the temperature of the walls defining said indentations having substantially no fusing effect upon said polyvinyl foam;
   contacting said face of said master mold with said polyvinyl foam;
   immediately applying a force to said mold to compress the background of said cotacting foam and form unfused embossed reproductions of said character indentations;
   cooling said molding material;
   removing said embossed material from said mold;
   placing the embossed polyvinyl foam in a vacuum;
   inking said embossed foam;
   heating said inked foam to substantially 140° Fahrenheit;
   adding pressure to return the environment to normal pressure; and
   cooling the heated inked foam to room temperature.

6. The process as defined in claim 2, wherein said contacting foam material includes a mixture of the following:

| | Parts (substantially) |
|---|---|
| Plastisol resin | 100 |
| Dipropylene glycol dibenzoate | 45 |
| Dicapryl phthalate | 35 |
| Epoxy plasticizer | 5 |
| Frothing agent and stabilizer | 15 |
| Magnesium silicate having an average chemical composition (by weight) of: 29% MgO, 57% $SiO_2$, 8% CaO, 2% $Al_2O_3$, $Fe_2O_3$ and 4% ignition loss | 15 |

7. The process as defined in claim 2, wherein said contacting foam material includes a mixture of the following:

| | (Parts (substantially) |
|---|---|
| Plastisol resin | 100 |
| Butyl benzyl phthalate | 45 |
| Dioctyl phthalate | 35 |
| Dibasic lead phosphite | 5 |
| Frothing agent and stabilizer | 15 |

8. The process as defined in claim 2, wherein said contacting foam material includes a mixture of the following:

| | Parts (substantially) |
|---|---|
| Plastisol resin | 100 |
| Butyl benzyl phthalate | 35 |
| Dicapryl phthalate | 30 |
| Low temperature epoxy plasticizer | 5 |
| Frothing agent and stabilizer | 12½ |

9. The process as defined in claim 2, wherein said contacting foam material includes a mixture of the following:

| | (Parts (substantially) |
|---|---|
| Plastisol resin | 100 |
| Dipropylene glycol dibenzoate | 45 |
| Dioctyl phthalate | 15 |
| Low temperature epoxy plasticizer | 5 |
| Cresyl diphenyl phosphate | 20 |
| Frothing agent and stabilizer | 15 |

10. The process as defined in claim 2, wherein said contacting foam material includes a mixture of the following:

| | Parts (substantially) |
|---|---|
| Plastisol resin | 85 |
| Copolymer dispersion resin | 15 |
| Dipropylene glycol dibenzoate | 45 |
| Dioctyl phthalate | 35 |
| Low temperature epoxy plasticizer | 5 |
| Frothing agent and stabilizer | 15 |

11. The process as defined in claim 2, wherein said contacting foam material includes a mixture of the following:

| | Parts (substantially) |
|---|---|
| Plastisol resin | 60 |
| Copolymer dispersion resin | 40 |
| Low temperature epoxy plasticizer | 5 |
| Frothing agent and stabilizer | 15 |

(References on following page)

References Cited

UNITED STATES PATENTS

| | | | |
|---|---|---|---|
| 2,536,316 | 1/1951 | Schwarz | 264—293 XR |
| 2,722,719 | 11/1955 | Altstadter | 264—321 XR |
| 3,104,192 | 9/1963 | Hacklander | 264—321 XR |
| 3,193,435 | 7/1965 | Schafer. | |

ROBERT F. WHITE, Primary Examiner

R. R. KUCIA, Assistant Examiner

U.S. Cl. X.R.

264—321, 293 132